United States Patent
Callas et al.

(10) Patent No.: US 6,546,919 B2
(45) Date of Patent: Apr. 15, 2003

(54) COMBINED REMOTE FIRST INTAKE AIR AFTERCOOLER AND A SECOND FLUID FROM AN ENGINE COOLER FOR AN ENGINE

(75) Inventors: James J. Callas, Peoria, IL (US); Ronald L. Dupree, Washington, IL (US); Donald W. Heston, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/123,323

(22) Filed: Apr. 16, 2002

(65) Prior Publication Data

US 2002/0189255 A1 Dec. 19, 2002

Related U.S. Application Data

(63) Continuation-in-part of application No. 09/881,495, filed on Jun. 14, 2001, now abandoned.

(51) Int. Cl.[7] .................................................. F02B 33/00
(52) U.S. Cl. ................. 123/563; 123/559.1; 123/41.49; 123/568.17; 60/599; 165/140
(58) Field of Search ............................. 123/563, 559.1, 123/41.49; 60/599; 55/269; 165/126, 41, 132, 140

(56) References Cited

U.S. PATENT DOCUMENTS

| | | | | |
|---|---|---|---|---|
| 3,203,499 A | * | 8/1965 | Bentz et al. ................... | 60/599 |
| 4,059,080 A | * | 11/1977 | Rudert ...................... | 123/41.49 |
| 4,273,082 A | * | 6/1981 | Tholen ........................ | 123/563 |
| 4,317,439 A | * | 3/1982 | Emmerling ................. | 123/563 |
| 4,474,162 A | * | 10/1984 | Mason ........................ | 123/563 |
| 4,562,697 A | * | 1/1986 | Lawson ....................... | 123/563 |
| 4,651,816 A | * | 3/1987 | Struss et al. ................ | 165/140 |
| 4,878,460 A | * | 11/1989 | Uchida et al. .............. | 123/563 |
| 5,095,882 A | * | 3/1992 | Christensen ................ | 123/563 |
| 5,234,051 A | * | 8/1993 | Weizenburger et al. ..... | 123/563 |
| 5,316,079 A | * | 5/1994 | Hedeen ....................... | 123/563 |
| 5,871,001 A | * | 2/1999 | Pelkey ........................ | 123/563 |
| 6,129,056 A | * | 10/2000 | Skeel et al. .............. | 123/41.49 |
| 6,216,677 B1 | * | 4/2001 | McConnell et al. ... | 123/568.24 |
| 6,267,106 B1 | * | 7/2001 | Feucht .................. | 123/568.17 |

FOREIGN PATENT DOCUMENTS

EP          0 178 266 A1  *  4/1986

* cited by examiner

*Primary Examiner*—Thomas Denion
*Assistant Examiner*—Thai-Ba Trieu
(74) *Attorney, Agent, or Firm*—Larry G Cain

(57) ABSTRACT

A cooling system has an air-to-air or first heat exchanger and a fluid or second heat exchanger mounted remotely from a main radiator for cooling an internal combustion engine. A filter filters a recipient fluid, such as an ambient air, before the recipient fluid passes through the first heat exchanger and the second heat exchanger. A cooled fluid is conducted to a flow of intake air for the internal combustion engine. A fan causes the recipient fluid to pass through the filter and the first heat exchanger and the second heat exchanger. The spent recipient fluid is discharged to atmosphere.

62 Claims, 4 Drawing Sheets

COMBINED REMOTE FIRST INTAKE AIR AFTERCOOLER AND A SECOND FLUID FROM AN ENGINE COOLER FOR AN ENGINE

CROSS REFERENCE TO RELATED APPLICATION

This is a continuation-in-part of application Ser. No. 09/881,495, filed on Jun. 14, 2001, now abandoned.

TECHNICAL FIELD

The present invention relates generally to a cooling systems for an internal combustion engines, and more particularly to an auxiliary or supplemental heat exchanger or cooling system for use in conjunction with a main conventional heat exchanger or radiator-type cooling system.

BACKGROUND

As being known, internal combustion engines, and the motor vehicle industry employing such engines fall within federal governmental regulations, for example, the Environmental Protection Agency (EPA), which mandate that emissions such as NOx emissions be reduced. One scheme or mode of operating internal combustion engines which has reduced NOx emissions has used exhaust gas recirculation (EGR). Another scheme or mode of operating internal combustion engines which has been used to increase power is to provide increased cooling of the incoming turbocharged air being introduced into the engine intake manifold.

One way to achieve such increased cooling of the incoming turbocharged air being introduced into the engine inlet manifold is to increase the size or density of the main engine heat exchanger or radiator-type cooling system. In effect, more cooling surface area is provided within the heat exchanger or radiator and greater cooling is provided. Conventionally, an internal combustion engine vehicle has a single or main heat exchanger or radiator-type cooling system for performing or satisfying all heat load requirements of the engine. For example, those attendant the water jacket, the hydraulic systems, the power train, and the like. However, such an increase in the size or density of the main engine heat exchanger or radiator is not always possible considering size constraints or limitations for housing the main heat exchanger or radiator upon or within a particular vehicle. In addition, such an increase in the size or density of the main engine heat exchanger or radiator entails a substantial increase in the resulting pressure drop across or characteristics of such heat exchanger or radiator which, in turn, necessitates increased power input levels or requirements in order to achieve sufficient air flow through the system. Such increased power input requirements or levels can be attained or met, for example, by increasing the speed of the main engine cooling fan. However, increasing the speed of the main engine cooling fan results in enhancing noise levels which may also pose compliance problems with respect to current Environmental Protection Agency (EPA) regulations.

In some applications, an air-to-air aftercooler or heat exchanger is used to increase the density of the intake air. For example, in some on-highway applications, the air-to-air aftercooler or heat exchanger is positioned in line with the vehicle radiator or main heat exchanger.

Exhaust gas recirculation (EGR) of a portion of the engine exhaust gas from the engine exhaust manifold back to the engine intake manifold is a technology that has been employed to help reduce harmful exhaust emissions from an engine. However, the high temperature level of such recirculated exhaust gas poses a problem with respect to the performance, longevity and emission output characteristics of the engine. Therefore, such recirculated hot engine exhaust gas needs to be cooled prior to ingestion into the engine intake manifold. However, if such cooling of the engine exhaust gas is to be conducted or performed by the main engine heat exchanger or radiator system, the aforenoted size constraints, size limitations, power requirements, and noise level disadvantages or drawbacks characteristics of conventional engine heat exchanger systems would still need to be addressed.

In applications requiring additional cooling over and above that of today's conventional engine, the size constraints, size limitations, power requirements, and noise level disadvantages or drawbacks pose problems and must be addressed by other non conventional apparatus.

The present invention is directed to overcoming one or more of the problems as set forth above.

SUMMARY OF THE INVENTION

In one aspect of the invention a cooling system is adapted for use with an internal combustion engine. The internal combustion engine has an engine block, an air intake manifold, a at least one turbocharger for providing inlet combustion air to the air intake manifold, an exhaust gas manifold, and a main radiator heat exchanger. The cooling system comprises: a recipient fluid; a first heat exchanger, separate from the main radiator heat exchanger and disposed upon the engine at a location remote from the main radiator heat exchanger, and having a first passageway defined therein which is fluidically connected to the recipient fluid; a second passageway defined within the first heat exchanger for receiving turbocharged air from the turbocharger, for conducting the turbocharged air through the first heat exchanger such that the turbocharged air undergoes a heat exchange process with the recipient fluid and can be conducted toward the engine intake manifold; a second heat exchanger, separate from the main radiator heat exchanger and disposed upon the engine at a location remote from the main radiator heat exchanger, and having a third passageway defined therein which is also fluidically connected to the recipient fluid; a fourth passageway defined within the second heat exchanger for receiving a fluid from the engine, for conducting the fluid through the second heat exchanger such that the engine fluid undergoes a heat exchange process with the recipient fluid and can be conducted toward the engine intake manifold; and a fan for causing the recipient fluid to pass through the first and third passageways of the first heat exchanger and the second heat exchanger, and for causing the recipient fluid to be discharged to atmosphere.

In another aspect of the invention a vehicle cooling system has an internal combustion engine having an engine block, an air intake manifold, at least a turbocharger for providing inlet combustion air to the air intake manifold, an exhaust gas manifold, and a main radiator heat exchanger. The vehicle cooling system comprises: a recipient fluid; a first heat exchanger, being separate from the main radiator heat exchanger and disposed upon the vehicle at a location remote from the main radiator heat exchanger, and having a first passageway defined therein which is fluidically connected to the recipient fluid; a second passageway defined within the first heat exchanger for receiving turbocharged air from the turbocharger, for conducting the turbocharged air through the first heat exchanger such that the turbocharged air undergoes a heat exchange process with the recipient fluid and can be conducted toward the engine intake manifold; a second heat exchanger, being separate from the main radiator heat exchanger and disposed upon the vehicle at a location remote from the main radiator heat exchanger, and having a third passageway defined therein which is also fluidically connected to the recipient fluid; a fourth passageway defined within the second heat exchanger for receiving a fluid from the engine, for conducting the fluid from the engine through the second heat exchanger such that the fluid from the engine undergo a heat exchange process with the recipient fluid and can be conducted toward the engine intake manifold; and a fan, causing the recipient fluid to pass through the first and third passageways of the first heat exchanger and the second heat exchanger, and causing the recipient fluid to be discharged to atmosphere.

In another aspect of the invention a method of cooling an internal combustion engine is disclosed. The internal combustion engine has an intake air and at least one of a fluid from the engine directed toward an intake manifold. The internal combustion engine has a block being liquid cooled, the intake manifold being connected to the block and has the intake air therein. An exhaust manifold of the internal combustion engine is connected to the block and has the exhaust gas therein. The method comprises: providing a recipient fluid; providing a flow of the recipient fluid; providing an internal combustion engine heat exchanger, the internal combustion engine heat exchanger cooling the liquid coolant within the internal combustion engine and the recipient fluid acting as a recipient fluid for the internal combustion engine heat exchanger; providing a first heat exchanger or an intake air heat exchanger, the intake air heat exchanger being remotely mounted from the internal combustion engine heat exchanger and being mounted to the internal combustion engine, and the recipient fluid acting as a recipient fluid for the intake air heat exchanger; providing a second heat exchanger, the second heat exchanger being remotely mounted from the internal combustion engine heat exchanger, and the recipient fluid acting as a recipient fluid for the second heat exchanger; and providing a connection between the intake air and the at least one of the fluid from the engine to the intake air.

DETAILED DESCRIPTION

Figure 1:
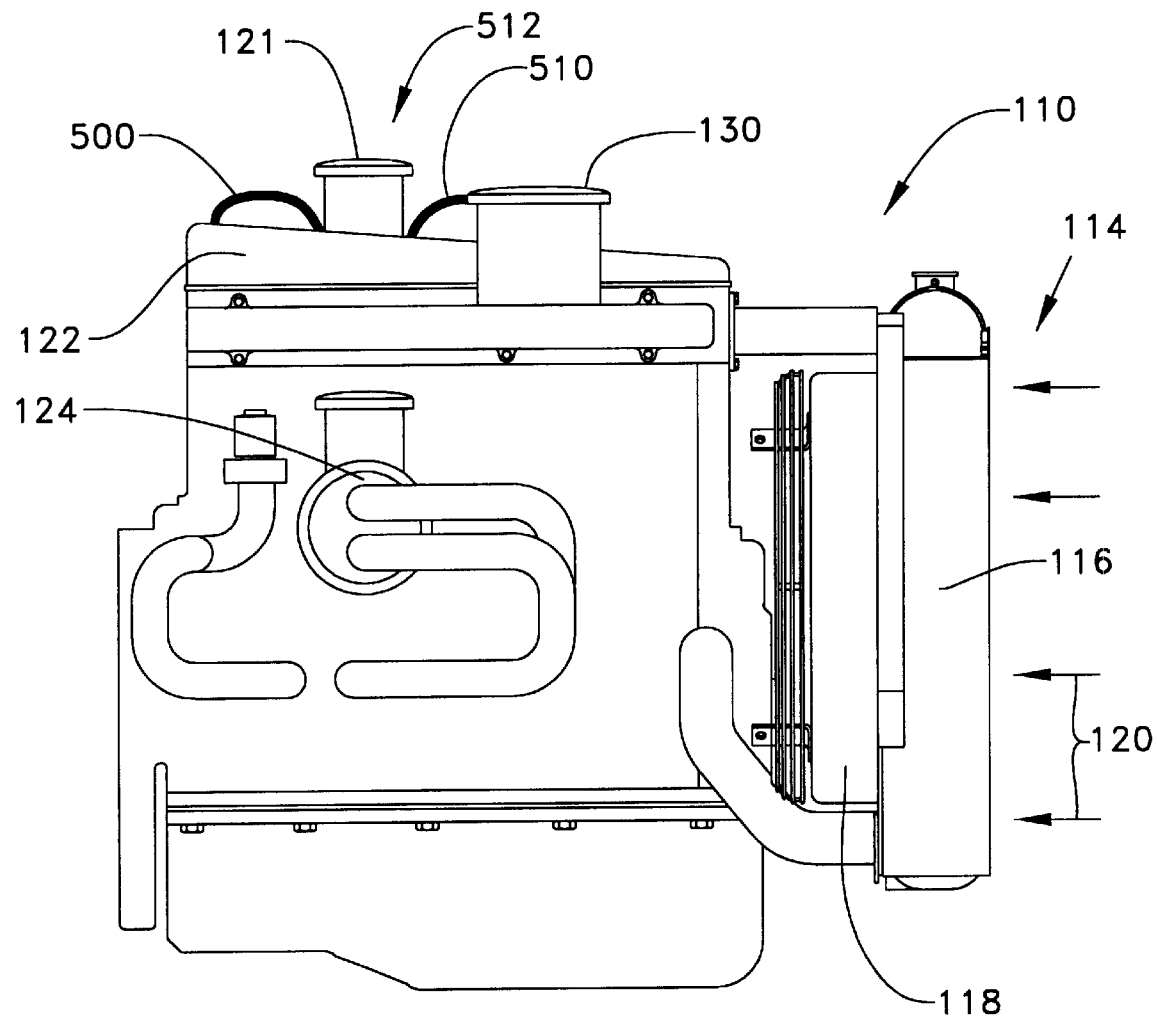
FIG. 1 is a side elevational of an internal combustion engine having a radiator and a combined remote mounted air-to-air aftercooler and a second heat exchanger.

Referring now to the drawings, and more particularly to FIG. 1, a general description of an internal combustion engine 110, which in this application is a diesel engine but could as an alternative be any configuration of an engine. A conventional radiator-type system 114 is shown having a heat exchanger 116 and a fan member 118 supplying a flow of atmospheric air, designated by arrow 120, being used as a recipient fluid to cool the coolant of the internal combustion engine 110. A primary, secondary, and tertiary air filters are serially provided and illustrated by reference numerals 121, 122 and 124, respectively. A combined remote mounted first heat exchanger, an air-to-air aftercooler and a second heat exchanger, an exhaust gas or a fluid from the engine heat exchange system 130 is shown. In this application, the disposition or orientation of the tertiary air filter 124 varies from a conventional orientation and is disposed 90° with respect to a conventional orientation. The orientation of the main radiator-type system 114 is unchanged despite the incorporation of the combined remote-mounted air-to-air aftercooler and exhaust gas or fluid cooler heat exchange system 130 within the engine 110. Thus, it should be noted that the combined remote-mounted air-to-air aftercooler and exhaust gas or fluid cooler heat exchange system 130 can be effectively retrofitted upon existing internal combustion engines.

Figure 2:
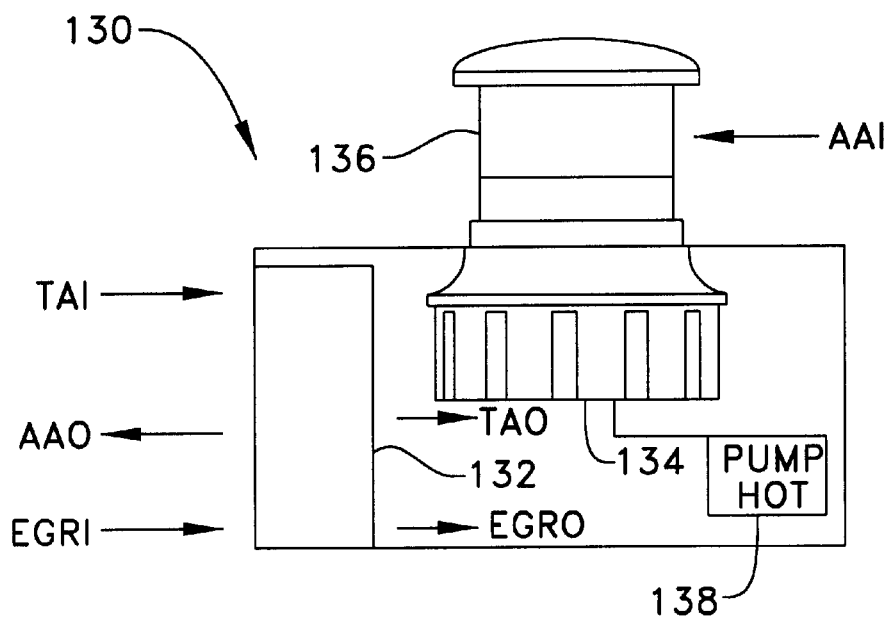
FIG. 2 is a schematic side elevational view of an embodiment of the combined remote mounted air-to-air aftercooler and the second heat exchanger.
Figure 3:
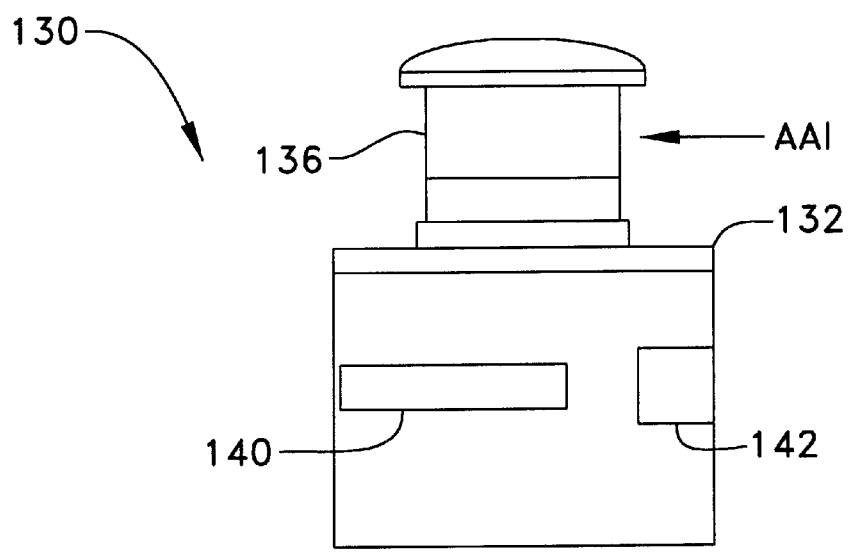
FIG. 3 is a front elevational view of the embodiment of FIG. 2 of the combined remote mounted air-to-air aftercooler and the second heat exchanger.

Referring to FIGS. 2 and 3, the combined remote-mounted air-to-air aftercooler and exhaust gas or fluid cooler heat exchange system 130 has an auxiliary heat exchanger core 132 which is separate, distinct, independent, and remote from the main radiator-type system 114. Upstream of the auxiliary heat exchanger core 132 is a first heat exchanger or aftercooler and a second heat exchanger and a cooling fan 134. The fan 134 draws relatively cool recipient fluid which in this application is an ambient air, denoted by the arrow AAI and acts as a recipient agent. As an alternative, the recipient fluid could be from another source, such as a refrigerant or other cooling medium. The ambient air flows through a filter 136 such that the relatively cool ambient air AAI is conducted toward the auxiliary heat exchanger core 132. Relatively hot air from the engine turbocharger, denoted by the arrow TAI acts as a donor fluid. The donor fluid is admitted into the auxiliary heat exchanger core 132 in a counter flow manner with respect to the incoming ambient air. The turbocharged air after passing through the auxiliary heat exchanger core 132 is exhausted as relatively cool turbocharged air, denoted by the arrow TAO, and is routed to the engine intake manifold as intake combustion air.

In a similar manner, relatively hot exhaust gas from the engine exhaust manifold, denoted by the arrow EGRI acts as a donor fluid. The donor fluid is recirculated from the engine exhaust manifold to the engine intake manifold. The hot exhaust gas is admitted into the auxiliary heat exchanger core 132 in a counter flow manner with respect to the incoming ambient air. The hot exhaust gas passes through the auxiliary heat exchanger core 132 and having undergone a heat exchange operation with respect to the relatively cool ambient air is exhausted as relatively cool exhaust gas, denoted by the arrow EGRO. The cooled exhaust gas is routed to the engine intake manifold as exhaust gas recirculation gas. The ambient air is exhausted to atmosphere as relatively hot ambient air as denoted by the arrow AAO.

The use of the filter 136 upstream of the first or auxiliary heat exchanger core 132 results in clean filtered ambient air being supplied to the auxiliary heat exchanger core 132.

Thus, a relatively dense or compact auxiliary heat exchanger core can be used since air entrained debris, is effectively removed. The use of a relatively dense or compact auxiliary heat exchanger core enhances the cooling of the turbocharger air and engine exhaust gas, which is the desirable objective. Due to the utilization of such a relatively dense or compact auxiliary heat exchanger core, which presents a relatively considerable or significant pressure drop for the air flow drawn through the auxiliary heat exchanger core 132, the heat exchanger or aftercooler and cooler fan 134 is a radial or backward curved centrifugal fan.

In this application, the heat exchanger or aftercooler and cooler fan 134 is operatively connected to and powered by either an electric motor or a hydraulic pump and motor drive 138. The motor drive 138 enables the heat exchanger or aftercooler and cooler fan 134 to be driven independently of the vehicle engine speed. And, the speed of the main radiator cooling fan 118 can remain at a constant speed controlling the flow of the ambient air 120 drawn through the auxiliary heat exchanger core 132.

With reference continuing to be made to FIG. 3, and in conjunction with reference also continuing to be made to FIG. 2, the auxiliary heat exchanger core 132 may be appropriately divided into, a first, air-to-air aftercooler, heat exchanger core 140 and a second, exhaust gas or the fluid from the engine, heat exchanger core 142. The relatively cool ambient air from the radial or centrifugal fan 134 and the relatively hot turbocharged combustion air from the engine turbocharger are conducted or passed in the aforenoted counter flowing manner through the heat exchanger core 140. The relatively cool ambient air from the radial or centrifugal fan 134 and the relatively hot exhaust gas or fluid from the engine are likewise conducted or passed in the aforenoted counter flowing manner. The two heat exchanger cores 140 and 142 are disposed as being disposed in a side-by-side relationship, and this construction of the combined or composite auxiliary heat exchanger core 132 permits the individual cores 140 and 142 to be fabricated from separate materials as may be desired. Obviously, particular manifolding or conduit structure, not actually shown, is of course provided in conjunction with each one of the cores 140 and 142 so as to respectively conduct the turbocharged combustion air and the engine exhaust gas or fluid from the engine through the air-to-air aftercooler core 140 and the exhaust gas recirculation or fluid from the engine core 142.

Figure 4:
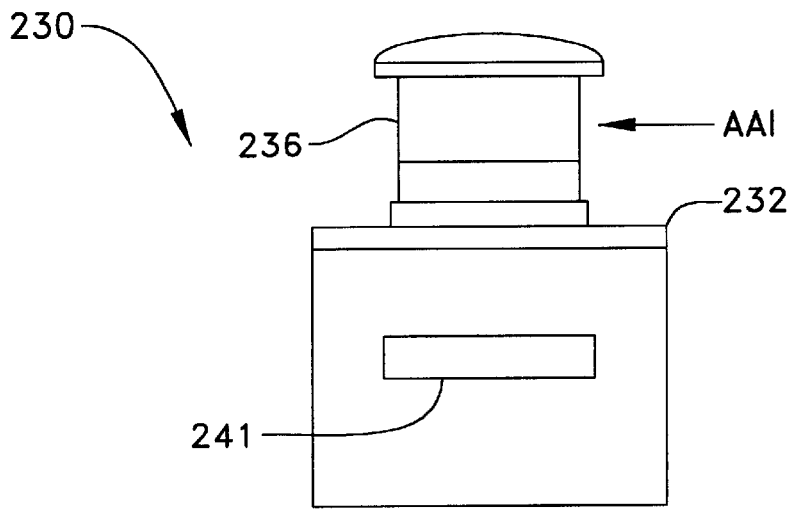
FIG. 4 is a front elevational similar to that of FIG. 3 showing, a modified embodiment of the combined remote mounted air-to-air aftercooler and the second heat exchanger.

Alternatively, with reference being made to FIG. 4, another of the combined or composite remote-mounted aftercooler and exhaust gas or fluid from the engine heat exchange system is designated by the reference character 230. It is noted that the combined remote-mounted air-to-air aftercooler and exhaust gas or fluid from the engine heat exchange system 230 is operatively similar to the combined remote-mounted air-to-air aftercooler and exhaust gas or fluid from the engine heat exchange system 130 illustrated in FIGS. 2 and 3. Therefore, parts of the combined remote-mounted air-to-air aftercooler and exhaust gas or fluid from the engine heat exchanger system 230 which correspond to similar parts of the combined remote-mounted air-to-air aftercooler and exhaust gas or fluid from the engine heat exchange system 130 of the first embodiment as illustrated in FIGS. 2 and 3 have been designated by similar reference characters. The reference characters of the combined remote-mounted air-to-air aftercooler and exhaust gas or fluid from the engine heat exchanger system 230 are noted as being within the 200 series.

As will also be appreciated from a comparison between the first embodiment of the combined remote-mounted air-to-air aftercooler and exhaust gas or fluid from the engine heat exchange system of FIGS. 2 and 3, and the second embodiment of the combined remote-mounted air-to-air aftercooler and exhaust gas or fluid from the engine heat exchange system of FIG. 4, there is only one major structural difference between such two combined air-to-air aftercooler and exhaust gas or fluid from the engine heat exchanger systems 130 and 230. The primary difference being the fact that in lieu of the separate air-to-air aftercooler and exhaust gas recirculation or fluid from the engine heat exchanger cores 140,142, the combined or composite auxiliary heat exchanger core 232 has a single heat exchanger core structure 241. Consequently, the fabrication of the composite auxiliary heat exchanger core 232 as a single heat exchanger core structure 241 is simplified. For example, the entire single heat exchanger core structure 241 can be fabricated from a single material and as a single entity whereby separate heat exchanger cores need not be subsequently bolted or otherwise affixed together.

It is to be further understood that in connection with either one of the combined remote-mounted air-to-air aftercooler and exhaust gas or fluid from the engine heat exchanger systems 130 or 230 respectively disclosed within the embodiments of FIGS. 2–3 and FIG. 4, that while the heat exchanger or aftercooler cores 140,142, or 241 can be constructed from either a primary surface type heat exchanger or a secondary surface type heat exchanger. A primary surface type heat exchanger is preferred for cooling efficiency purposes and for structural integrity. A secondary surface heat exchanger is one in which a tubular pipe or conduit, carrying a fluid to be cooled, has a plurality of radiator fins projecting radially outwardly from the external peripheral surface of the tubular pipe or conduit. A primary surface heat exchanger is one in which the radiator fins have in effect been eliminated and in lieu thereof, interdigitated conduits for the respective gas and air flows are defined between sheet components which together form the heat exchanger. In this application the sheets are corrugated. The density of the heat exchange components, and the resulting heat exchanger surface areas, can be increased resulting in enhanced cooling.

Figure 6:
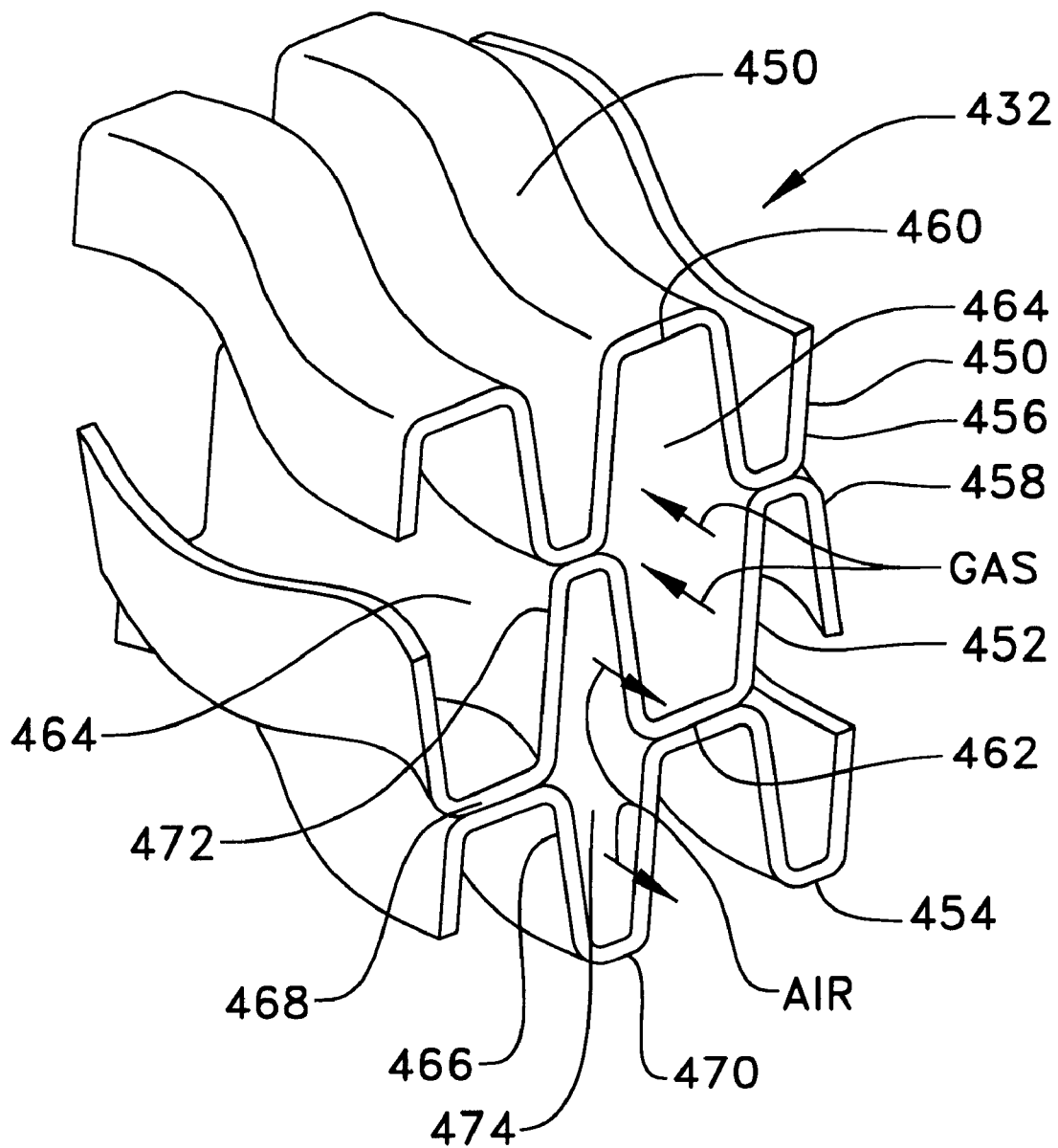
FIG. 6 is a schematic perspective view showing a primary surface-type heat exchanger which can be used as the heat exchanger component within either one of the combined heat exchanger system embodiments illustrated in FIGS. 1–5.

More particularly, as seen in FIG. 6, there is disclosed a primary surface heat exchanger which is generally indicated by the reference character 432. The heat exchanger is formed from three vertically stacked corrugated sheets of material 450,452, and 454. The corrugated sheets may be formed from any one of a plurality of materials, such as, stainless steel or aluminum or a non-metallic materials, such as, nylon or other thermoplastic materials, or the like. The upper corrugated sheet 450 and the intermediate corrugated sheet 452 are disposed in an opposite sense or orientation with respect to each other so as not to be nested and wherein the respective concave portions 456 and 458 of the sheets 450 and 452 are in abutment with each other, while the respective convex portions 460 and 462 of the sheets 450 and 452 are disposed remote from each other. In this manner, the upper and intermediate sheets 450 and 452 define a plurality of gas conduits or donor passages 464 therebetween.

In a similar manner, the lower corrugated sheet 454 and the intermediate corrugated sheet 452 are disposed in an opposite sense or orientation with respect to each other so as not to be nested and wherein the respective concave portions 466 and 468 of the sheets 454 and 452 are in abutment with each other, while the respective convex portions 470 and 472 of the sheets 454 and 452 are disposed remote from each other. In this manner, the lower and intermediate sheets 454 and 452 define a plurality of air conduits or recipient passages 474 therebetween. As a result of the arrangement of the sheets 450,452,454, and the respective formation of the gas conduits 464 and air conduits 474 therebetween, the upper end portion of each one of the air conduits 474 is partially interdigitated between the lower end portions of a pair of adjacent gas conduits 464, and similarly, considered from a reverse point of view, the lower end portion of each one of the gas conduits 464 is partially interdigitated between the upper end portions of adjacent air conduits 474. In this manner, enhanced heat exchange between the air and gas flowing within the conduits 474 and 464 is achieved.

With reference again being made to FIG. 6, another embodiment of a composite remote-mounted aftercooler and exhaust gas or fluid from the engine heat exchange system 330 is shown. The major difference between this third embodiment system 330 and the first and second embodiment systems, 130 and 230 respectively, resides in the fact that in lieu of the turbocharger combustion air air-to-air aftercooler core and the exhaust gas recirculation or fluid from the engine core being disposed in a side-by-side relationship wherein the relatively cool ambient air from the fan is conducted simultaneously through both the turbocharger combustion air air-to-air aftercooler core and the exhaust gas recirculation or fluid from the engine core, the turbocharger combustion air air-to-air aftercooler core 340 and the exhaust gas recirculation or fluid from the engine core 342 are disposed in a serial manner with the turbocharger combustion air air-to-air aftercooler core 340 being disposed upstream of the exhaust gas recirculation or fluid from the engine core 342.

In this manner, the frontal area of, in effect, the combined or composite auxiliary heat exchanger core 332 is smaller than the respective frontal areas of the combined or composite auxiliary heat exchanger cores 132 and 232 of the first and second embodiments shown in FIGS. 2–4. It is to be appreciated and understood that the relatively cool ambient air supplied by the radial fan 334 will serve to cool the turbocharger combustion air air-to-air aftercooler core 340, and that the same air, which will now be heated to some degree after having passed through the turbocharger combustion air air-to-air aftercooler core 340 in heat exchange with the relatively hot turbocharger combustion air, will be used to cool the relatively hot engine exhaust gas or fluid from the engine flowing or being conducted through the exhaust gas recirculation or fluid from the engine core 342. Thus, the size and operational parameters of the fan 334 need only be sufficient to provide the cooling air to the turbocharger combustion air air-to-air aftercooler core 340 since the exhaust air from such core is then used for cooling and heat exchange within the exhaust gas recirculation or fluid from the engine core 342.

As is further shown in FIG. 1, the internal combustion engine 110 has a first turbocharger 500 thereon. A second turbocharger 510 is positioned in series with the first turbocharger 500. The compressed intake air from the first turbocharger 500 has a first predetermined compression ratio, FPCR. The FPCR air from the first turbocharger 500 is communicated to the auxiliary heat exchanger core 130, 230 and 140 and acts as a donor fluid in a counter flow manner with respect to the incoming ambient air and is exhausted as relatively cool FPCR air. The FPCR air is communicated to the second turbocharger 510 in a conventional manner and is compressed to a second predetermined compression ratio, SPCR being greater than the FPCR. The flow of SPCR air is communicated to the auxiliary heat exchanger core 130, 230 and 142 and acts as a donor fluid in a counter flow manner with respect to the incoming ambient air and is exhaust as relative cool SPCR intake air. The SPCR intake air is communicated within the internal combustion engine 110 and is mixed with a fuel and combusted. Further, the internal combustion engine 110 depicts a series turbocharger system 512 requiring further cooling of a flow of compressed intake air, or a fluid from the engine, for the internal combustion engine in combination with the remote mounted air-to-air aftercooler or first heat exchanger and the second heat exchanger.

Industrial Applicability

It is thus to be appreciated that as a result of the provision or arrangement of the combined remote-mounted, turbocharger combustion air air-to-air aftercooler or first hear exchanger and exhaust gas recirculation or fluid from the engine second heat exchanger, system of the present invention as utilized in conjunction with, for example, a diesel type internal combustion engine as disclosed within FIGS. 1 through 6. And, regardless of whether the combined remote-mounted, turbocharger combustion air air-to-air aftercooler and exhaust gas recirculation or fluid from the engine heat exchanger, arrangement or system has the particular structural arrangement of the first embodiment disclosed within FIG. 4, or the third embodiment disclosed within FIG. 5, various operational advantages are able to be achieved. With the new and improved combined remote-mounted, turbocharger combustion air air-to-air aftercooler and exhaust gas recirculation or fluid from the engine heat exchanger, system or arrangement constructed and used in accordance with the principles and teachings of the present invention, additional cooling is provided for cooling the incoming combustion air to the engine intake manifold, as well as for cooling the recirculated exhaust gas or for further cooling of further compressed combustion air. The arrangement does not effect the main cooling heat exchanger or radiator which is then free to perform the other cooling functions, or address the other cooling loads, of the engine. Sufficient air flow and cooling of the incoming turbocharger air, of the recirculated exhaust gas, and of the series turbocharged combustion inlet air to the engine intake manifold is therefore achieved without necessitating an increase in the size and operational noise of the main cooling heat exchanger or radiator. Alternatively, the size of the main cooling heat exchanger or radiator can be reduced. The fan of the combined remote-mounted, turbocharger combustion air air-to-air aftercooler, the exhaust gas recirculation, or the fluid from the engine heat exchanger, system is also driven by its own motor drive so as to be able to be operated independently of the engine speed or load.

Still further, the utilization of the combined remote-mounted, turbocharger combustion air air-to-air aftercooler and exhaust gas recirculation or fluid from the engine heat exchanger, system as disclosed herein permits such system to be mounted in effect as a retrofitted system with respect to existing or conventional vehicle heat exchanger arrangements or systems. In accordance with the various illustrated embodiments, it should also be appreciated that when the heated ambient air is exhausted to atmosphere, such heated air is directed away from both the fan of the turbocharger air aftercooler core and the exhaust gas recirculation or fluid from the engine, and the main radiator fan so as not to be ingested into the intake or incoming air streams of either fan.

It is to be additionally noted that in connection with the cooling of the hot engine exhaust gas being recirculated or the series turbocharged combustion intake air, in accordance with exhaust gas recirculation techniques, from the engine exhaust manifold to the engine intake manifold, the cooling of the exhaust gas must be monitored and controlled such that condensation of undesirable pollutants does not occur. Accordingly, the exhaust gas recirculation or fluid cooler cores 142 and 342, as well as the section of the combined core 241 through which the engine exhaust gas or fluid is conducted, may be provided with suitable dampers, butterfly valves, and the like so as to close off or shut down cooling air flow through such cores or core section and thereby effectively prevent the overcooling of the engine exhaust gas or fluid.

Figure 5:
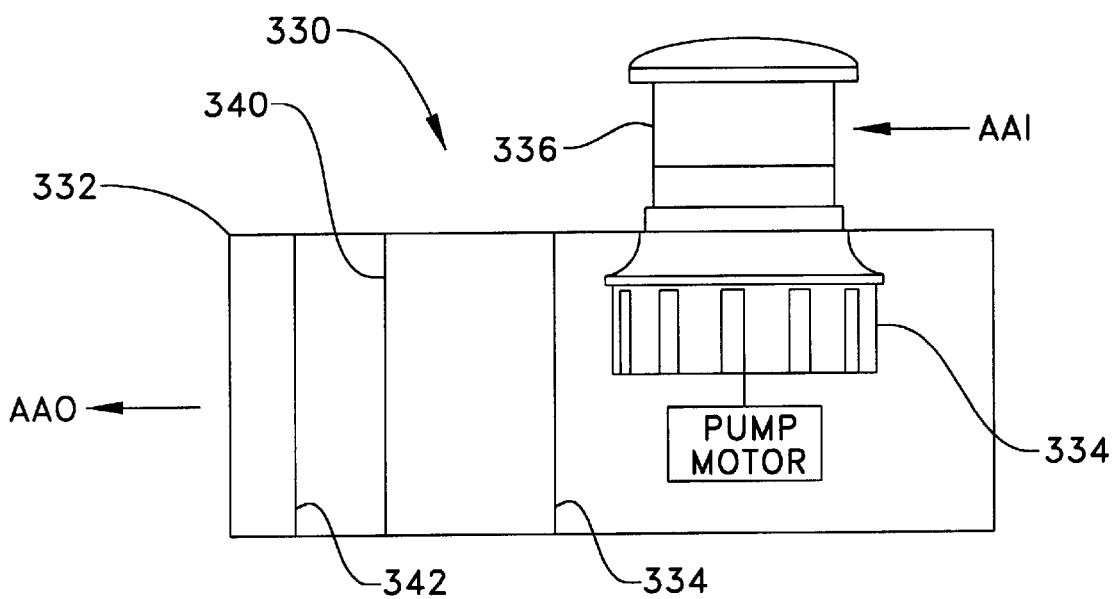
FIG. 5 is a schematic side elevational view similar to that of FIG. 2 showing, another embodiment of the combined remote mounted air-to-air aftercooler and the second heat exchanger.

It is noted still further that while in the first and second embodiments of the invention system as disclosed in FIGS. 3–4, the combined cooler cores 132 and 232 were preferred to be primary surface type heat exchangers, in the third embodiment of the invention as disclosed in FIG. 5, it is acceptable that the cooler cores 340 and 342 be either a primary surface type heat exchanger or a secondary type heat exchanger. The latter secondary type heat exchanger is sufficient in view of the fact that as a result of the serial disposition of the cooler cores 340 and 342, each core can have a frontal area which is greater, for example, than the individual cooler cores 140 and 142 of FIG. 3. Consequently, a compact or densely packed heat exchanger is not necessarily required. Concomitantly, since the cooler cores 340 and 342 may be secondary surface type heat exchangers, the upstream filter 336 may be eliminated if so desired because fouling of the secondary surface type heat exchangers by atmospheric debris is not as likely or critical as when the cooler cores is the primary surface heat exchangers.

Obviously, many variations and modifications of the present invention are possible in light of the above teachings. Other aspects, objects and advantages of this invention can be obtained from a study of the drawings, disclosure and the appended claims.

What is claimed is:

1. A cooling system adapted for use with an internal combustion engine, the internal combustion engine having an engine block, an air intake manifold, at least one turbocharger for providing inlet combustion air to the air intake manifold, an exhaust gas manifold, and a main radiator heat exchanger, said cooling system comprising:
   a recipient fluid;
   a first heat exchanger, separate from the main radiator heat exchanger and disposed upon the engine at a location remote from the main radiator heat exchanger, and having a first passageway defined therein which is fluidically connected to said recipient fluid;
   a second passageway defined within said first heat exchanger for receiving turbocharged air from the turbocharger, for conducting said turbocharged air through said first heat exchanger such that said turbocharged air undergoes a heat exchange process with said recipient fluid and can be conducted toward the engine intake manifold;
   a second heat exchanger, separate from the main radiator heat exchanger and disposed upon the engine at a location remote from the main radiator heat exchanger, and having a third passageway defined therein which is also fluidically connected for receiving said recipient fluid;
   a fourth passageway defined within said second heat exchanger for receiving a fluid from the engine, for conducting said fluid through said second heat exchanger such that said engine fluid undergoes a heat exchange process with said recipient fluid and can be conducted toward the engine intake manifold; and
   a fan for causing said recipient fluid to pass through said first and third passageways of said first heat exchanger and said second heat exchanger, and for causing said recipient fluid to be discharged to atmosphere.

2. The cooling system of claim 1 wherein said fan includes a backward-curved centrifugal fan.

3. The cooling system of claim 1 wherein said fan includes a radial centrifugal fan.

4. The cooling system of claim 1 including a filter through which said recipient fluid passes prior to passing through said first heat exchanger and said second heat exchanger.

5. The cooling system of claim 4 wherein said fan is interposed said filter and said first heat exchanger, as well as between said filter and said second heat exchanger, said fan drawing said recipient fluid through said filter and forcing said ambient air through said first heat exchanger and said second heat exchanger.

6. The cooling system of claim 1 wherein said first heat exchanger and said second heat exchanger are disposed in a side by side relationship.

7. The cooling system of claim 1 wherein said first heat exchanger and said second heat exchanger are separate heat exchangers fabricated from separate materials.

8. The cooling system of claim 1 wherein said first heat exchanger and said second heat exchanger includes a single heat exchanger fabricated from the same materials.

9. The cooling system of claim 1 wherein said first heat exchanger and said second heat exchanger are disposed in a serial relationship.

10. The cooling system of claim 1 wherein said first heat exchanger and said second heat exchanger are fabricated from different materials.

11. The cooling system of claim 1 including a motor drive operatively connected to said fan for driving said fan independently of the load and speed of the vehicular engine.

12. The cooling system of claim 1 wherein at least said first heat exchanger and said second heat exchanger include a primary surface-type heat exchangers.

13. The cooling system of claim 12 wherein each one of said primary surface-type heat exchangers has three sheets of corrugated material defining two interdigitated fluid passageways therebetween for said ambient air and either one of said turbocharged air and said fluid from said engine wherein a portion of a first one of said two fluid passageways is interposed portions of a second one of said two fluid passageways, while a portion of said second one of said two fluid passageways is interposed portions of said first one of said two passageways enhancing said heat exchange process between said ambient air and said turbocharged air and said fluid from said engine.

14. The cooling system of claim 13 wherein said corrugated material including said primary surface-type heat exchanger having a material selected from the group including stainless steel, aluminum, and a thermoplastic resin material.

15. The cooling system of claim 1 wherein said internal combustion engine including a first turbocharger and a second turbocharger.

16. The cooling system of claim 15 wherein said first turbocharger and said second turbocharger are positioned in series having said inlet combustion air passing through said first turbocharger and defining a first predetermined compression ratio of said inlet combustion air.

17. The cooling system of claim 16 wherein said first predetermined compression ratio of said inlet combustion air passing through said first heat exchanger and being conducted toward said second turbocharger.

18. The cooling system of claim 16 wherein said first predetermined compression ratio of said inlet combustion air after passing through said second turbocharger defining a second predetermined compression ratio of said inlet combustion air, said second predetermined compression ratio being greater than said first predetermined compression ratio.

19. The cooling system of claim 18 wherein said second predetermined compression ratio of said inlet combustion air being passed through said second heat exchanger.

20. The cooling system of claim 19 wherein said second predetermined compression ratio of said inlet combustion air being said fluid from said engine.

21. The cooling system of claim 1 wherein said recipient fluid being an ambient air.

22. A vehicle cooling system having an internal combustion engine having an engine block, an air intake manifold, at least a turbocharger for providing inlet combustion air to the air intake manifold, an exhaust gas manifold, and a main radiator heat exchanger, said vehicle comprising:
- a recipient fluid;
- a first heat exchanger, being separate from the main radiator heat exchanger and disposed upon the vehicle at a location remote from the main radiator heat exchanger, and having a first passageway defined therein which is fluidically connected to said recipient fluid;
- a second passageway defined within said first heat exchanger for receiving turbocharged air from the turbocharger, for conducting said turbocharged air through said first heat exchanger such that said turbocharged air undergoes a heat exchange process with said recipient fluid and can be conducted toward the engine intake manifold;
- a second heat exchanger, being separate from the main radiator heat exchanger and disposed upon the vehicle at a location remote from the main radiator heat exchanger, and having a third passageway defined therein which is also fluidically connected to said recipient fluid;
- a fourth passageway defined within said second heat exchanger for receiving a fluid from the engine, for conducting said fluid from the engine through said second heat exchanger such that said fluid from the engine undergo a heat exchange process with said recipient fluid and can be conducted toward the engine intake manifold; and
- a fan, causing said recipient fluid to pass through said first and third passageways of said first heat exchanger and said second heat exchanger, and causing said recipient fluid to be discharged to atmosphere.

23. The vehicle cooling system of claim 22 wherein said fan includes a backward-curved centrifugal fan.

24. The vehicle cooling system of claim 22 wherein said fan includes a radial centrifugal fan.

25. The vehicle cooling system of claim 22 including a filter through which said recipient fluid passes prior to passing through said first heat exchanger and said second heat exchanger.

26. The vehicle cooling system of claim 25 wherein said fan is interposed said filter and said first heat exchanger, as well as between said filter and said second heat exchanger, said fan drawing said recipient fluid through said filter and forcing said recipient fluid through said first heat exchanger and said second heat exchanger.

27. The vehicle cooling system of claim 22 wherein said first heat exchanger and said second heat exchanger are disposed in a side-by-side relationship.

28. The vehicle cooling system of claim 22 wherein said first heat exchanger and said second heat exchanger are separate heat exchangers fabricated from separate materials.

29. The vehicle cooling system of claim 22 wherein said first heat exchanger and said second heat exchanger includes a single heat exchanger fabricated from the same materials.

30. The vehicle cooling system of claim 22 wherein said first heat exchanger and said second heat exchanger are disposed in a serial relationship.

31. The vehicle cooling system of claim 22 wherein said first heat exchanger and said second heat exchanger are fabricated from different materials.

32. The vehicle cooling system of claim 22 including a motor drive operatively connected to said fan for driving said fan independently of the load and speed of the vehicular engine.

33. The vehicle cooling system of claim 22 wherein both said first heat exchanger and said second heat exchanger include a primary esurface-type heat exchangers.

34. The vehicle cooling system of claim 22 wherein said internal combustion engine including a first turbocharger and a second turbocharger.

35. The vehicle cooling system of claim 34 wherein said first turbocharger and said second turbocharger are positioned in series having said inlet combustion air passing through said first turbocharger and defining a first predetermined compression ratio of said inlet combustion air.

36. The vehicle cooling system of claim 35 wherein said first predetermined compression ratio of said inlet combustion air passing through said first heat exchanger and being conducted toward said second turbocharger.

37. The vehicle cooling system of claim 36 wherein said first predetermined compression ratio of said inlet combustion air after passing through said second turbocharger defining a second predetermined compression ratio of said inlet combustion air.

38. The vehicle cooling system of claim 37 wherein said second predetermined compression ratio of said inlet combustion air being passed through said second heat exchanger.

39. The vehicle cooling system of claim 38 wherein said second predetermined compression ratio of said inlet combustion air being said fluid from said engine.

40. The vehicle cooling system of claim 22 wherein said recipient fluid being an ambient air.

41. A method of cooling an internal combustion engine, an intake air and at least one of a fluid from said engine directed toward an intake air manifold, said internal combustion engine having a block being liquid cooled, the intake manifold being connected to said block and having said intake air therein, an exhaust manifold being connected to said block and having said exhaust gas therein, said method comprising:
- providing a recipient fluid;
- providing a flow of recipient fluid;
- providing an internal combustion engine heat exchanger, said internal combustion engine heat exchanger cooling said liquid coolant within said internal combustion engine and said recipient fluid acting as a recipient fluid for said internal combustion engine heat exchanger;
- providing a first heat exchanger or an intake air heat exchanger, said intake air heat exchanger being remotely mounted from said internal combustion engine heat exchanger and being mounted to said internal combustion engine, and said recipient fluid for said internal combustion engine heat exchanger acting as a recipient fluid for said intake air heat exchanger;

providing a second heat exchanger, said second heat exchanger being remotely mounted from said internal combustion engine heat exchanger and being mounted to said internal combustion engine, and said recipient fluid from said internal combustion engine heat exchanger acting as a recipient fluid for said second heat exchanger; and providing a connection between said intake air and said fluid from the engine to said intake manifold.

42. The method of cooling of claim 41 wherein said step of providing the flow of said recipient fluid being provided by a fan having a backward-curved centrifugal fan.

43. The method of cooling of claim 42 wherein said step of providing the flow of said ambient air being provided by a radial centrifugal fan.

44. The method of cooling of claim 41 including providing a filter through which said recipient fluid passes prior to passing through said first heat exchanger and said second heat exchanger.

45. The method of cooling of claim 44 wherein said step of providing the flow of said recipient fluid having a fan interposed said first heat exchanger and said filter.

46. The method of cooling of claim 41 wherein said step of providing the flow of said recipient fluid air having said fan interposed said second heat exchanger and said filter.

47. The method of cooling of claim 41 wherein said step of providing the first heat exchanger and said step of providing the second heat exchanger having said first heat exchanger and said second heat exchanger being positioned in a side by side orientation.

48. The method of cooling of claim 41 wherein said step of providing the first heat exchanger and said step of providing the second heat exchanger having said first heat exchanger and said second heat exchanger being separate heat exchangers fabricated from separate materials.

49. The method of cooling of claim 41 wherein said step of providing the first heat exchanger and said step of providing the second heat exchanger having said first heat exchanger and said second heat exchanger being a single heat exchanger fabricated from the same materials.

50. The method of cooling of claim 41 wherein said step of providing the first heat exchanger and said step of providing the second heat exchanger having said first heat exchanger and said second heat exchanger being disposed in a serial relationship.

51. The method of cooling of claim 41 wherein said step of providing the first heat exchanger and said step of providing the second heat exchanger having said first heat exchanger and said second heat exchanger being fabricated from different materials.

52. The method of cooling of claim 42 wherein said step of providing the flow of said recipient fluid includes a fan having a motor drive operatively connected to said fan and driving said fan independently of the load and speed of the vehicular engine.

53. The method of cooling of claim 41 wherein said step of providing the first heat exchanger includes said first heat exchanger being a primary surface type heat exchangers.

54. The method of cooling of claim 41 wherein said step of providing the second heat exchanger includes said second heat exchanger being a primary surface type heat exchanger.

55. The method of cooling of claim 41 wherein said step of providing the first heat exchanger and said step of providing the second heat exchanger includes at least one of said first heat exchanger and said second heat exchanger being a primary surface type heat exchanger.

56. The method of cooling of claim 41 wherein said internal combustion engine includes providing a first turbocharger and a second turbocharger.

57. The method of cooling of claim 56 wherein said first turbocharger and said second turbocharger being positioned in series having said inlet combustion air passing through said first turbocharger and defining a first predetermined compression ratio of said inlet combustion air.

58. The method of cooling of claim 57 wherein said first predetermined compression ratio of said inlet combustion air passing through said first heat exchanger and being conducted toward said second turbocharger.

59. The method of cooling of claim 58 wherein said first predetermined compression ratio of said inlet combustion air after passing through said second turbocharger defining a second predetermined compression ratio of said inlet combustion air, said second predetermined compression ratio being greater than said first predetermined compression ratio.

60. The method of cooling of claim 59 wherein said second predetermined compression ratio of said inlet combustion air being passed through said second heat exchanger.

61. The method of cooling of claim 60 wherein said second predetermined compression ratio of said inlet combustion air being said fluid from said engine.

62. The method of cooling of claim 41 wherein said recipient fluid being an ambient air.

* * * * *